Patented Feb. 10, 1953

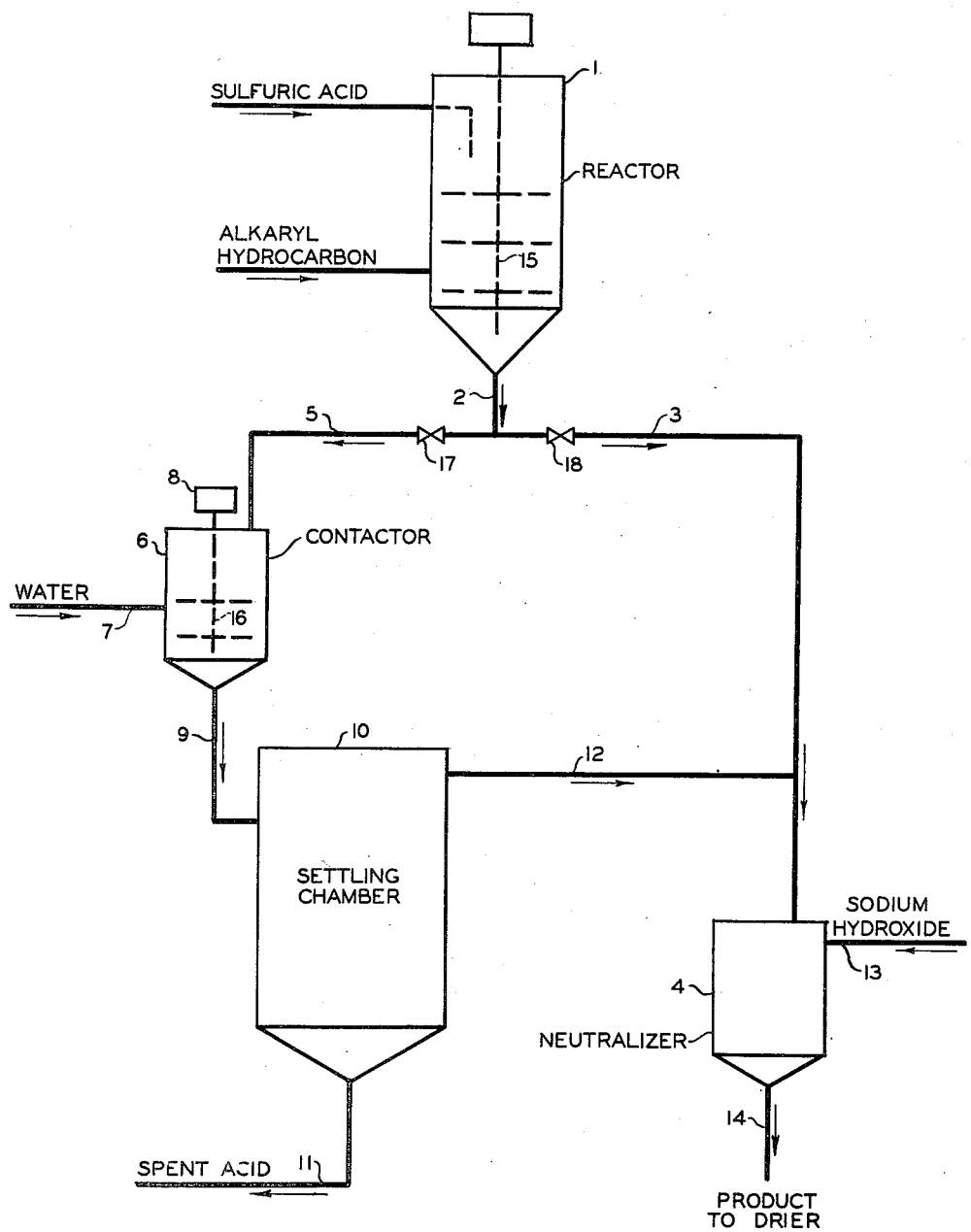

2,628,200

UNITED STATES PATENT OFFICE 2,628,200

PRODUCTION OF ALKARYL SULFONATE DETERGENT COMPOSITIONS, INCLUDING A METHOD OF CONTROLLING THE SODIUM SULFATE CONTENT THEREOF

Willie W. Crouch, Bartlesville, Okla., assignor to Phillips Petroleum Company, a corporation of Delaware Application December 28, 1948, Serial No. 67,748

4 Claims. (Cl. 252—161)

This invention relates to the production of synthetic detergents. In one of its preferred embodiments it relates to a process for the production of sodium alkaryl sulfonate detergents containing sodium sulfate and having a controlled composition.

In the sulfnation of alkaryl hydrocarbons with sulfuric acid the usual practice is to sulfonate with 1.3 to 2.0 weights of 100 to 105 per cent sulfuric acid per weight of alkaryl hydrocarbon, neutralize the reaction mixture with sodium hydroxide, and recover the mixture of sodium sulfate and sulfonate. This mixture can be used as such or blended with additional builders (the sodium sulfate acts as a builder for improving detergency). If the entire reaction mixture is neutralized and recovered, the sodium sulfate content of the dried sulfate-sulfonate mixture varies in the range of about 45–85 per cent depending on (1) the molecular weight of the alkaryl hydrocarbon, (2) the weight and concentration of the sulfuric acid and (3) the per cent conversion of the alkaryl hydrocarbon.

It is often desirable to add auxiliary builders to the sulfate-sulfonate mixture, particularly water softening or sequestering agents such as sodium carbonate, trisodium phosphate, tetrasodium pyrophosphate, sodium tetraphosphate, sodium hexametaphosphate, sodium tripolyphosphate, sodium carboxymethyl cellulose, and the like. However, if these auxiliary builders are added in substantial amounts, such addition reduces still further the concentration of the active detergent, sodium alkaryl sulfonate, in the mixture to a figure often too low for a satisfactory product. Therefore, it is desirable under these conditions to remove part of the sodium sulfate in some manner. Such removal methods as have heretofore been employed involve an undesirable expenditure of materials and time. Furthermore, it has often been difficult to obtain reproducible results as the sodium sulfate content of the final detergent often varies from that predicted.

An object of my invention is to provide an improved method for preparing detergents composed of sodium sulfate plus sodium alkaryl sulfonates.

Another object of the invention is to permit simple and reliable control of sodium sulfate content of sodium alkaryl sulfonate detergents.

A further object is to provide an improved method for the continuous production of synthetic detergents.

Yet another object is to permit production of sodium alkaryl sulfonate detergents with sodium sulfate contents intermediate those obtained by removal of all excess sulfonation acid prior to neutralization on the one hand and neutralization of the entire sulfonation mixture on the other hand.

Further objects and advantages of the invention will be apparent, to one skilled in the art, from the accompanying disclosure and discussion.

I have now invented a novel process for producing alkaryl sulfonates of controlled sodium sulfate content. According to my process in preferred embodiments the reaction effluent from the sulfonation of an alkaryl hydrocarbon with sulfuric acid is divided into two portions, hereinafter designated as portions A and B, in conformity to a ratio which is dependent upon the degree of sodium sulfate reduction desired in the product. To portion A is added sufficient water to obtain layers, a lower layer rich in sulfuric acid and an upper layer rich in alkaryl sulfonic acid. The lower layer is discarded and the upper layer is recovered and recombined with the untreated portion B. This combined material is then neutralized with sodium hydroxide and the neutralized product dried to give the final detergent composition. The ratio of A to B is regulated so that the final neutralized and dried alkaryl sulfonate contains the desired amount of sodium sulfate.

A significant advantage of my invention lies in the fact that the process can be controlled to produce a detergent mixture of any predetermined sodium sulfate content within a broad range regardless of the weight and concentration of sulfuric acid used in the sulfonation procedure and whether or not auxiliary builders are employed. Another advantage of my invention lies in the fact that it provides a means for obtaining a product from the sulfonation reaction which is of constant composition and thereby facilitates subsequent operations such as drying, blending and packaging. Another advantage of this process of my invention is that it is readily adapted to a continuous sulfonation process.

Further advantage of the invention will be ascertained from the accompanying drawing and description thereof. The drawing is a schematic flow diagram in which is shown one arrangement of apparatus elements and flow of materials there through suitable for the practice of the invention. The flow diagram represents either a continuous or a batch process.

In the drawing, a chosen alkaryl hydrocarbon, for example a dodecyl benzene, is reacted with an excess of concentrated sulfuric acid or oleum in reactor 1 containing a stirrer 15. The sulfonation mixture flows from sulfonation reactor 1 via line 2 whence a portion of the mixture flows through valve 18 and via line 3 to neutralizer 4 and the other portion is introduced via valve 17 and line 5 to contactor 6. Water flows via line 7 into the contactor 6 where agitator 16 driven by motor 8 thoroughly mixes the sulfonation mixture with the water. The mixture from contactor 6 is introduced via line 9 to settling chamber 10 where liquid phases separate. The lower layer, rich in sulfuric acid, is withdrawn via line 11 and the upper layer, rich in alkaryl sulfonic acids, is withdrawn through line 12, and combined with the portion of the original sulfonation mixture in line 3 and this combined mixture enters neutralizer 4. Concentrated aqueous sodium hydroxide solution is introduced via line 13 to neutralize the mixture of sulfuric and sulfonic acids present. The stream from the neutralizer containing the predetermined mixture of sodium alkaryl sulfonates and sodium sulfate is introduced via line 14 to a drier to remove the major portion of the water. In instances where it is desired to add an auxiliary builder, such additional materials may be added to any suitable point in the process, for instance, to the neutralizer or to the line 14 from the neutralizer.

The process of my invention is particularly adaptable to continuous operation. When operating continuously all streams represented on the flow diagram flow continuously and at a constant rate.

While I have generally preferred to divide the stream of sulfonation mixture from a single sulfonation reactor into two separate streams and treat one stream with water in the manner described, it is also to be understood that, instead of dividing the stream from a single sulfonation reactor, the entire effluent from one sulfonation reactor can be treated with water after which this treated sulfonation mixture can be combined with the untreated effluent from one or more additional sulfonation reactors and the combined streams then neutralized together.

My process is particularly advantageous for use in conjunction with a continuous sulfonation process wherein large quantities of highly concentrated sulfuric acid (1.5 to 2.0 weights of 102–107 per cent sulfuric acid per weight of alkaryl hydrocarbon), low temperature (40–90° F.), and a relatively short contact time are used. Operating under these conditions makes possible the production of a high quality product, light in color at high yields, and results in considerable saving in reaction time. However, such drastic sulfonation conditions have seldom been used in commercial practice because when so operating the sulfonation mixture from the reactor contains a particularly high percentage of sulfuric acid. Such a sulfonation mixture, neutralized with sodium hydroxide and dried, yields an alkaryl sulfonate product too high (65–85 per cent) in sodium sulfate content for a satisfactory detergent for many applications. By the process of my invention it is possible to use large quantities of concentrated sulfuric acid (oleum) in the sulfonation step and still obtain a detergent of satisfactorily low sodium sulfate content.

In the practice of the invention the composition of the product from the driers is easily controlled. Samples of the dried product from the driers taken at intervals and analyzed for sodium sulfate content provide a check on the production composition. If a small change in the sulfonation conditions should cause a change in the composition of the sulfonation mixture leaving the reactor, the composition of the dried product will reflect such change. The ratio of the sulfonation mixture to be treated with water, as described, to that going directly to the neutralizer may then be adjusted accordingly so that the dried product again contains the desired percentage sodium sulfate.

It is a feature of my invention that the control of the sodium sulfate content of the product is a function of the ratio of the portion of a sulfonation mixture to be treated with water in a suitable contactor (portion A) to the untreated portion B, the ratio of water to portion A being maintained constant. The minimum sodium sulfate content would be obtained in one extreme by passing all of the sulfonation mixture through the water treatment in the contactor while the maximum sodium sulfate content would be obtained in the other extreme by neutralizing the entire sulfonation mixture without the water treatment. Any sodium sulfate content lying between these two extremes can be obtained in the process of my invention by varying the ratio of A to B.

The only limitations set upon the particular value of the ratio of water to portion A chosen for operation are: (1) there should be enough water to obtain two well-defined liquid phases and (2) there should not be enough water to cause excessive loss of the alkaryl sulfonic acids to the sulfuric acid phase. Thus, the amount of water added to portion A in the contactor will be such that water and sulfuric acid ($H_2SO_4$) will be present in proportions equivalent to aqueous sulfuric acid having a concentration lying in the range of 70 to 95 per cent.

The alkaryl sulfonic acids to which my invention finds its application are preferably the sulfonation products of mono or disubstituted alkyl derivatives of benzene, toluene or naphthalene. The substituting components are aliphatic side chains (straight or branched) containing 6 to 20 carbon atoms. Any mixture of such alkaryl sulfonic acids is also applicable in the invention. Mixtures rather than pure compounds are often obtained by sulfonating an alkylated aromatic material which has been formed by catalytic alkylation of an aromatic hydrocarbon or hydrocarbons with mixed olefins or other alkylating reactants, such as a high olefin content fraction of a cracked hydrocarbon material, or an olefin polymer fraction. While alkaline materials other than sodium hydroxide could be used to effect neutralization, they are more expensive and the resulting sulfates are in general inferior to sodium sulfate in building properties for the detergent.

The following examples will further illustrate specific features of the process of my invention, but the invention is not necessarily restricted to the exact quantities which show by way of example.

*Example I*

One pound of an alkylate consisting of a mixture of monoalkylbenzenes, boiling range 550 to 700° F., was charged to a sulfonation reactor with 1.25 pounds of 105 per cent sulfuric acid. The reactor mixture was stirred for about one hour while the temperature was maintained in the range of 70 to 100° F. The sulfonation mixture taken from the reactor was divided into two portions of 0.68 pound and 1.57 pounds, respectively.

The 0.68 pound portion was stirred for about 10 minutes with 0.0334 pound of water.

This amount of water was estimated to be such that water and sulfuric acid were present in proportions equivalent to aqueous sulfuric acid having a concentration of about 90 per cent. This mixture was allowed to stand quiescent for a short time. Two liquid layers were formed and the lower layer, comprising principally sulfuric acid, was discarded. The upper layer was recovered and recombined with the 1.57 pounds portion of the original sulfonation mixture. This combined mixture was then neutralized to pH 7 with 35 per cent aqueous sodium hydroxide solution and dried. Analysis of the dried product showed that it contained 42.6 per cent sodium sulfate.

Analysis of a neutralized and dried sample of the same sulfonation mixture which had received no treatment to remove sulfuric acid showed that it contained 51.1 per cent sodium sulfate.

Example II 1.6 pounds of an alkylate consisting of a mixture of monoalkylbenzenes, boiling range 550 to 700° F., was charged to a sulfonation reactor with 2.0 pounds of 105 per cent sulfuric acid. The reaction mixture was stirred for about 15 minutes while the temperature was maintained in the range of 65 to 70° F. The sulfonation mixture taken from the reactor was divided into two portions of 2.88 and 0.72 pounds, respectively. The 2.88 pounds portion was stirred for about 10 minutes with 0.24 pound of water. This amount of water was estimated to be such that water and sulfuric acid were present in proportions equivalent to aqueous sulfuric acid having a concentration of about 83 per cent. This mixture was allowed to stand quiescent for a short time. Two liquid layers were formed and the lower layer comprising principally sulfuric acid was discarded. The upper layer was recovered and recombined with the 0.72 pound portion of the original sulfonation mixture. This combined mixture was then neutralized to pH 7 with 35 per cent aqueous sodium hydroxide solution and dried. Analysis of the dried product showed that it contained 31.5 per cent sodium sulfate.

Example III

A continuous sulfonation was effected in a stirred reactor wherein monoalkyltoluenes, boiling range 540–720° F., were sulfonated with 2.0 weights of 104 per cent sulfuric acid per weight of the alkaryl hydrocarbons. Reactor temperature was maintained at 40 to 50° F. Average residence time in the reactor was 12 minutes. The sulfonation mixture from the reactor was withdrawn continuously at a constant rate of 9.0 pounds per hour and this stream was separated continuously into two streams flowing at the rate of 3.0 and 6.0 pounds per hour, respectively. The smaller stream flowed continuously into an agitated contactor wherein water was introduced continuously at the rate of 0.126 pound per hour. This amount of water was estimated to be such that water and sulfuric acid were present in the contactor in proportions equivalent to aqueous sulfuric acid having a concentration of about 94 percent. This mixture then entered the settling chamber at the rate of 3.126 pounds per hour where liquid layers formed. The contents of the settling chamber were maintained at a constant level. The lower layer in the settling chamber comprising principally sulfuric acid was continuously withdrawn while the upper layer was continuously transferred to a neutralizer in which it was mixed with the untreated 6.0 pounds per hour stream from the sulfonation reactor. This mixture was continuously neutralized with 35 per cent aqueous sodium hydroxide solution so that the effluent from the neutralizer was maintained at pH 7. Analysis of dried samples from the neutralizer showed that the product cotnained 57.7 per cent sodium sulfate. The product dried readily to form an exceptionally light-colored flaked solid.

Example IV

A continuous sulfonation was effected in a stirred reactor wherein monoalkyltoluenes, boiling range 540–720° F., were sulfonated with 1.4 weights of 105 per cent sulfuric acid per weight of the alkaryl hydrocarbon. Reactor temperature was maintained at 65–75° F. Average residence time in the reactor was 20 minutes. 2.4 pounds of the sulfonation mixture from the reactor were collected and separated into two portions of 1.8 and 0.6 pounds, respectively. The 1.8 pounds portion was stirred for about 10 minutes with 0.109 pound of water. This amount of water was estimated to be such that water and sulfuric acid were present in proportions equivalent to aqueous sulfuric acid having a concentration of about 88 per cent. This mixture was allowed to stand quiescent for a short time. Two liquid layers were formed and the lower layer comprising principally sulfuric acid was discarded. The upper layer was recovered and recombined with the 0.6 pound portion of the original untreated sulfonation mixture. The combined mixture was then neutralized to pH 7 with 35 per cent aqueous sodium hydroxide solution. 2.470 pounds of sodium tetraphosphate were added to the neutralized mixture and the mixture was then dried. Analysis of the dried detergent mixture showed that it contained 19.0 per cent sodium sulfate and 54.4 per cent sodium tetraphosphate.

I claim:

1. An improved method for obtaining a predetermined sodium sulfate content detergent mixture comprising sodium sulfate and sodium alkaryl sulfonate, which comprises reacting an alkylated aromatic organic material with an excess of sulfuric acid under sulfonation conditions, dividing the resulting sulfonation mixture containing free sulfuric acid into two portions A and B, the relative quantities of A and B being chosen to produce the desired sodium sulfate content in the final detergent mixture, admixing A with sufficient water to cause formation of a sulfuric acid-rich lower layer and a sulfonic acid-rich upper layer upon settling, settling the mixture and recovering the upper layer, admixing same with B which has remained untreated, neutralizing the resulting admixture with sodium hydroxide, and drying the neutralized product to form a detergent mixture containing sodium alkaryl sulfonate and sodium sulfate builder in controlled quantity.

2. An improved method for producing an alkaryl sulfonate detergent material of controlled composition which comprises dividing a mixture of alkaryl sulfonic acid with sulfuric acid into two portions, removing at least part of the sulfuric acid from one of said portions, combining the resulting sulfuric acid-poor portion of alkaryl sulfonic acid with the other said portion, and reacting the resulting admixture with an alkaline sodium compound to form a detergent product comprising sodium alkaryl sulfonate having a sodium sulfate content intermediate that of a product obtained by neutralization of the entire mixture of alkaryl sulfonic acid with sulfuric acid on the one hand and removal of sulfuric acid from the entire said mixture prior to neutralization on the other hand.

3. A continuous process of producing a detergent of fixed builder content which comprises continuously sulfonating with an excess of sulfuric acid an alkyl aromatic hydrocarbon having such alkyl side chain structure that its sulfonate has detergent qualities, continuously withdrawing sulfonation mixture and dividing same into two portions A and B, the ratio of A to B being regulated in accordance with the sodium sulfate content of the finished detergent as hereinafter described, continuously admixing A with water in a fixed water:A ratio sufficient to cause separation of most of the sulfuric acid content from the sulfonic acid content of A by phase separation, continuously effecting formation of a heavy water-sulfuric acid phase and a light sulfonic acid phase, continuously recovering the latter and admixing same with untreated B, continuously neutralizing the resulting admixture with sodium hydroxide to pH 7, continuously drying the neutralized product to form a finished sodium alkaryl sulfonate detergent having a sodium sulfate builder content dependent on the sulfonation conditions and the A:B ratio, determining the sodium sulfate content of the finished detergent at least periodically, and whenever said determined content varies from a desired value changing the A:B ratio while maintaining a fixed water:A ratio sufficiently to return the said sodium sulfate content to said desired value, said A:B ratio being increased when the sodium sulfate content increases and decreased when the sodium sulfate content decreases.

4. A continuous process of producing a detergent of desired builder content which comprises continuously sulfonating with an excess of sulfuric acid an alkyl aromatic hydrocarbon having such alkyl side chain structure that its sulfonate has detergent qualities, continuously withdrawing sulfonation mixture and dividing same into two portions A and B, the ratio of A to B being regulated in accordance with the sodium sulfate content of the finished detergent as hereinafter described, continuously removing a fixed proportion of the sulfuric acid content of A to form a sulfuric acid-poor sulfonic acid-rich A, continuously admixing the latter with untreated B, continuously neutralizing the resulting admixture with an alkaline sodium compound to a constant pH to form a finished sodium alkaryl sulfonate detergent having a sodium sulfate builder content dependent on the A:B ratio, and changing the A:B ratio sufficiently to change the said sodium sulfate content to a desired value whenever it is desired to change said content, said A:B ratio being increased when the sodium sulfate content is to be increased and decreased when the sodium sulfate content is to be decreased.

WILLIE W. CROUCH.

REFERENCES CITED

The following references are of record in the file of this patent:

UNITED STATES PATENTS

| Number | Name | Date |
|---|---|---|
| 2,233,408 | Flett | Mar. 4, 1941 |
| 2,373,793 | Susie | Apr. 17, 1945 |
| 2,456,119 | Friedman | Dec. 14, 1948 |
| 2,470,896 | Mavity | May 24, 1949 |